UNITED STATES PATENT OFFICE.

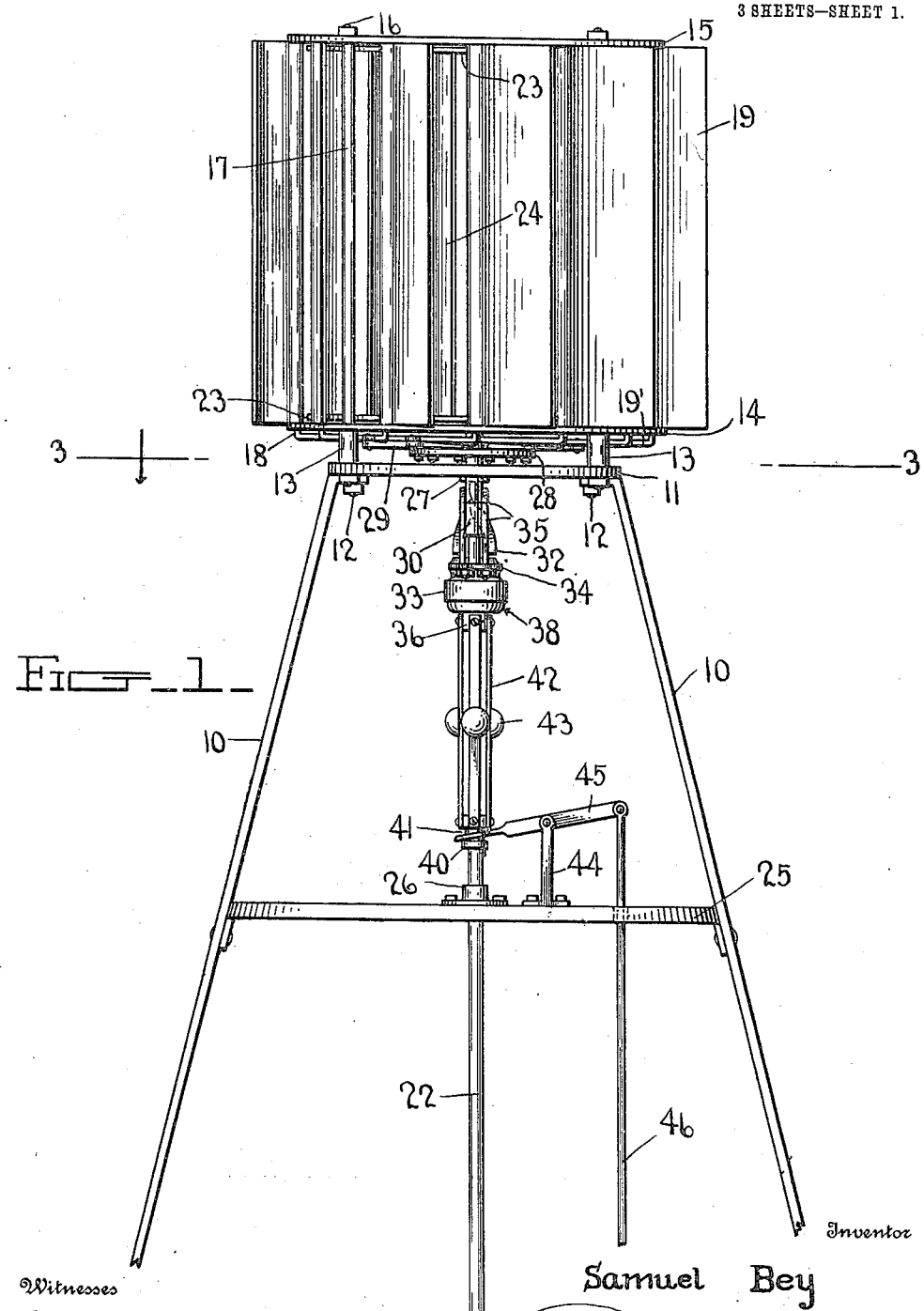

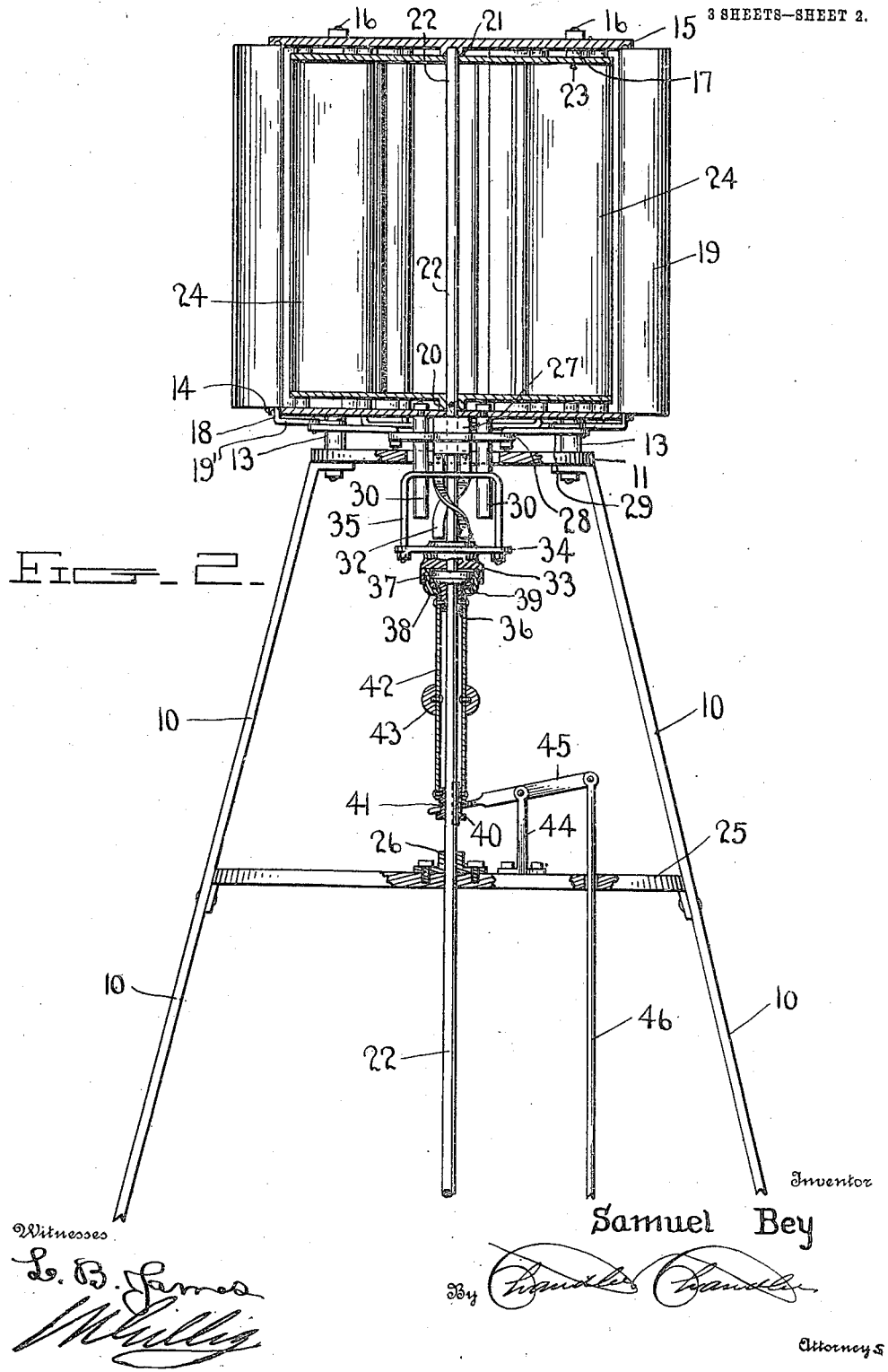

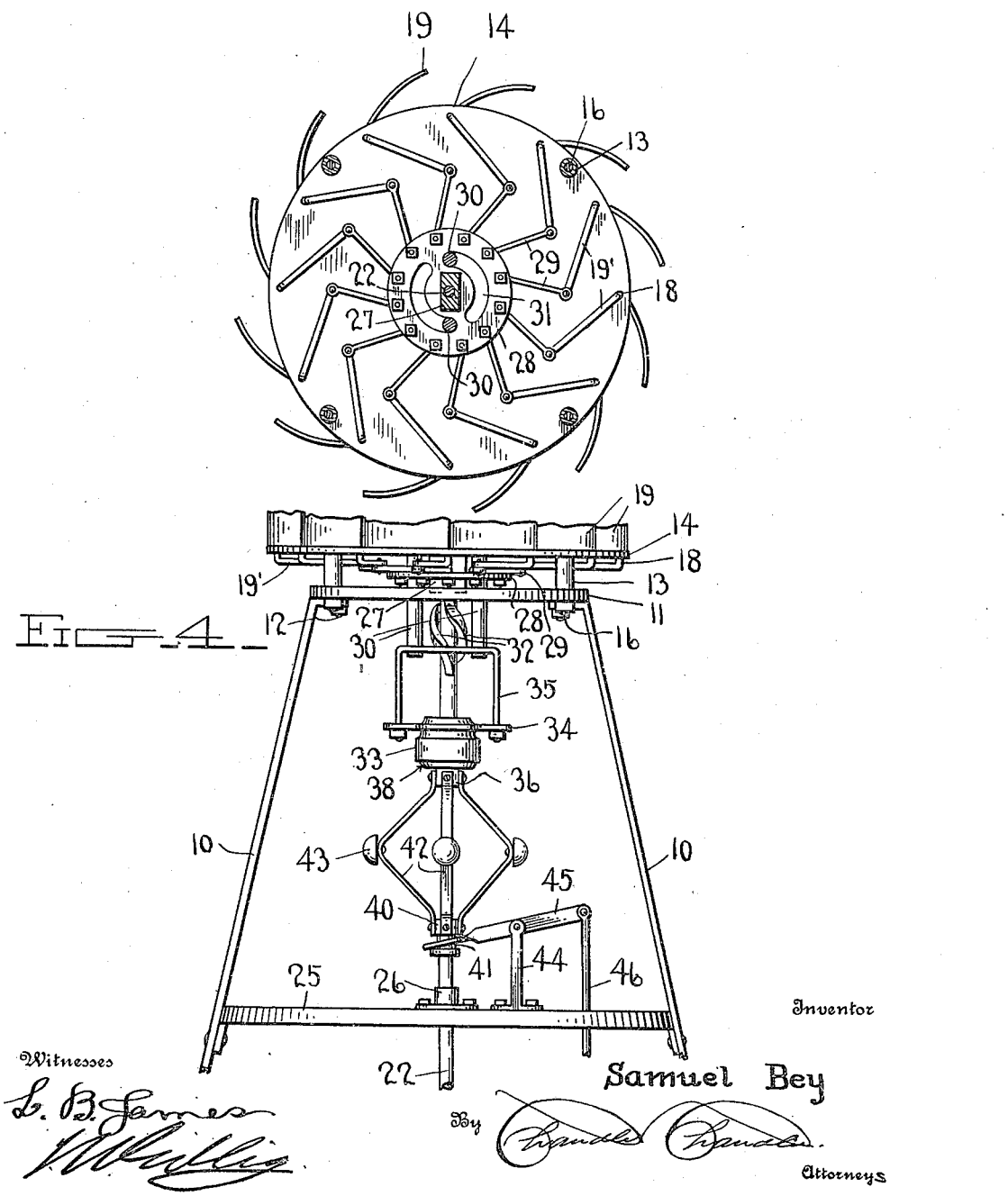

SAMUEL BEY, OF BENNINGTON, NEW YORK.

WINDMILL.

964,374.

Specification of Letters Patent.

Patented July 12, 1910.

Application filed May 14, 1909. Serial No. 495,880.

*To all whom it may concern:*

Be it known that I, SAMUEL BEY, a citizen of the United States, residing at Bennington, in the county of Wyoming, State of New York, have invented certain new and useful Improvements in Windmills; and I do hereby declare the following to be a full, clear, and exact description of the invention, such as will enable others skilled in the art to which it appertains to make and use the same.

This invention relates to wind mills and has a special reference to a wind mill of the horizontally revoluble type.

One object of the invention is to improve the general construction of wind mills of this character.

Another object of the invention is to provide an improved means for regulating the vane openings of mills of this character.

A third object of the invention is to provide an improved form of manually controlled governor mechanism for mills of this character so that the speed may be varied at will and yet kept constant without reference to the force of the wind.

With the above and other objects in view as will hereinafter be apparent the invention consists in general of an outer casing provided with wind gathering vanes, a wind wheel revolving within the outer casing, and certain improved vane regulating mechanism.

The invention further consists in certain novel details of construction and combinations of parts hereinafter fully described, illustrated in the accompanying drawings, and specifically set forth in the claims.

In the accompanying drawings, like characters of reference indicate like parts in the several views, and:—Figure 1 is a side elevation of the head of a wind mill tower equipped with a mill constructed in accordance with this invention. Fig. 2 is a vertical median section on the line 2—2 of Fig. 1. Fig. 3 is a bottom plan view of the outer casing and vane actuating mechanism. Fig. 4 is a detail view of the governing mechanism showing the position assumed by the governor when the outer casing is entirely closed.

The numeral 10 indicates the legs of a wind mill tower and upon these legs is supported a top platform 11. Secured in spaced relation to the top platform 11 by means of suitable bolts 12 and sleeves 13 is an outer casing bottom plate 14. An outer casing top plate 15 is held in spaced relation to the bottom plate 14 by means of suitable bolts 16 provided with spacing sleeves 17.

Between the plates 14 and 15 and rotatably mounted therein are a series of shafts 18 to each of which is fixed a wind gathering vane 19 so arranged that the successive vanes overlap each other to make a substantially cylindrical casing when said vanes are closed. Each of the shafts 18 is provided on the end beneath the plate 14 with an arm 19' which is fixedly mounted on the shaft.

Extending through the lower plate 14 of the casing and held in a suitable bearing 20 located thereabove and in a suitable bearing 21 located beneath the plate 15 is a wind wheel shaft 22 whereon are fixed spaced end plates 23 between which are rigidly mounted a series of wind vanes 24. At 25 is a lower platform and on this platform is mounted a guide bearing 26 through which extends the shaft 22. The shaft 22 is free to revolve in these bearings and as the wind enters the outer casing, being directed therein by the guide vanes 19, the air strikes the wind-wheel vanes 24 and rotates the shaft 22.

Rotatably mounted upon the shaft 22 and immediately beneath the bearing 20 is a block 27 which supports a circular plate 28 having a series of links 29 connected thereto at one end while the other ends are connected respectively to the various arms 19'. It will be observed that the lengths of the arms 19' and links 29 are so regulated that at all times the links and arms occupy an angular relation which is substantially a right angle to each other. Bars 30 are spaced on opposite sides of the shaft 22 and are firmly attached to the bottom plate 14. These bars extend below the plate 28 and for the purpose of permitting them to pass through the plate as well as for the purpose of limiting the movement thereof this plate 28 is provided with a pair of oppositely disposed concentrically arranged arcuate slots 31 through which the said bars pass. It will now be plain that, as the bottom casing plate 14 is rigidly attached to the platform 11 and cannot therefore be rotated, the rotation of the plate 28 will move the arms 19' and cause the vanes 19 to open or close according as the arms are moved outward or inward. In order that this may be accomplished by governor actuated mechanism the block 27 has projecting downward therefrom a pair of opposed spiriform members 32. Upon the shaft 22 is mounted a bearing 33 provided with a plate 34 fixed thereto and rising from this plate 34 are a pair of rectangular U-shaped members 35 which closely embrace the bars 30 and spiriform members 32. These spiriform members 32 are further arranged so that they do not touch the shaft 22 but form a species of double worm therearound. By reason of this construction if the bearing 33 be moved downward from the position indicated in Fig. 2 it will assume the position shown in Fig. 4 and since the members 35 are held from rotation by the downwardly projecting bars 30 the spiriform members 32 will be caused to rotate and carry with them the plate 28 with the consequence that the guide vanes 19 will be open or closed according to the direction of movement of the bearing 33 and the amount thereof.

At 36 is a sleeve which surrounds the shaft 22, said shaft being freely rotatable therein and this sleeve is preferably provided with a ball cone 37. A cup 38 is screwed into a cylindrical recess made in the bottom of the member 33 and serves to hold the wall 39 securely against the ball cone 37.

At 40 is a sleeve provided with a shipper fork groove 41 extending therearound and this sleeve 40 is held on the shaft 22 to be freely rotatable therewith. Secured at their upper ends to the lower end of the sleeve 36 and at their lower ends to the sleeve 40 are a plurality of spring members 42 each of which has attached intermediate its ends a governor ball 43. While the sleeve 40 rotates with the shaft 22 it is splined on that shaft in such manner that it may slide longitudinally thereof. In order to provide for the proper positioning of the sleeve 40 along the shaft 22 there is mounted on the platform 25 a standard 44 having a forked upper end and supporting a shipper lever 45 which has its end engaged with the groove 41 of the member 40. The other end of this lever 45 has connected thereto a reach rod 46 which is provided at the foot of the tower with any suitable mechanism for moving the lever 45 and locking it in the adjusted position. This mechanism is not deemed necessary here to be shown as the same forms no part of my invention and any of the ordinary devices commonly used for such purposes may be utilized in this case. In any event when the position of the sleeve has been manually adjusted it is intended that there shall be some form of locking mechanism to retain it in such adjustment until such a time as it is desired to manually readjust the same.

In order to understand the entire operation of the device let it be supposed that the sleeve has been manually adjusted to the position shown in Fig. 2. In Fig. 2 the vanes 19 are indicated as wide open. Now so long as the wind remains moderate the balls 43 will lie close to the shaft 22. If, however, the wind increases the wind vanes 24 will rotate the moving wheel more rapidly and cause the balls 43 to move outward by centrifugal action from the shaft 22. This will cause the members 35 to move downward since the member 40 cannot move upward by reason of the pull rod 46 being fixed at its lower end. As these members 35 move downward they rotate the members 32 as previously described and this causes the plate 28 to rotate and partially closes the guide vanes 19. It will be noted that the amount of closure of these guide vanes depends entirely upon the speed of rotation of the shaft 22 so long as the sleeve 40 remains fixed in any position. In this manner, therefore, the speed of rotation is regulated within the limit of the sensitiveness of the governor.

If it be desired to increase the speed of rotation from the arrangement shown in Fig. 2, it is merely necessary to raise the sleeve 40 by means of the pull rod 46 and lock it in its newly adjusted position. This will cause the governor ball 43 to move outward and will consequently place the springs 42 under tension. Now as these springs have already been placed under tension by the upward movement of the sleeve 40 it will require a greater force to move them out than would be the case if they were not under tension as indicated in Fig. 2, and consequently the guide vanes 19 would be held fully open until the speed of rotation of the shaft 22 had become sufficient to develop the greater centrifugal force required to move the ball 43 farther out. As soon, however, as this should take place the vanes 19 would be closed in the manner previously described. It will thus be seen that the device is not only capable of being automatically controlled but may be manually adjusted to varying speeds while at the same time retaining the automatic control by the governor mechanism. There has thus been provided a simple and efficient device of the kind described and for the purpose specified.

It is obvious that minor changes may be made in the form and construction of this invention without departing from the material principles thereof. It is not therefore desired to confine the invention to the exact form herein shown and described, but it is wished to include all such as properly come within the scope of the appended claims.

Having thus described the invention, what is claimed as new, is:—

1. In a windmill, a casing comprising spaced end plates, guide vanes pivotally mounted around said casing, a wind wheel shaft disposed in said casing and projecting therefrom, a wind wheel fixed thereon, a rotatable plate held adjacent the casing, operative connections between said plate and guide vanes, opposed spiriform members extending from said plate, guides fixed on said casing, an element held to embrace the guides and spiriform members, and movable longitudinally thereof, and a governor to control the position of said element.

2. In a windmill, a casing comprising spaced end plates, guide vanes pivotally mounted around said casing, a wind wheel shaft disposed in said casing and projecting therefrom, a wind wheel fixed on said shaft, a rotatable plate held adjacent the casing, operative connections between said plate and guide vanes, opposed spiriform members extending from said plate, guides fixed on said casing, an element held to embrace the guides and spiriform members and movable longitudinally thereof, a governor to control the position of said element, and manually operable means to vary the sensitiveness of said governor.

3. In a windmill, a casing comprising spaced end plates, guide vanes pivotally mounted around said casing, a wind wheel shaft disposed in said casing and projecting therefrom, a wind wheel fixed thereon, a rotatable plate held adjacent the casing and provided with opposed arcuate slots arranged concentrically of said plate, operative connections between said plate and guide vanes, opposed spiriform members extending from said plate, guides fixed on said casing and passing through said slots, an element held to embrace the guides and spiriform members and movable longitudinally thereof, a governor to control the position of said element, and manually operable means to vary the sensitiveness of said governor.

4. In a windmill, a casing comprising spaced end plates, guide vanes pivotally mounted around said casing, a wind wheel shaft disposed in said casing and projecting therefrom, a wind wheel fixed on said shaft, a rotatable plate held adjacent the casing, operative connections between said plate and guide vanes, opposed spiriform members extending from said plate, guides fixed on said casing, an element held to embrace the guides and spiriform members and movable longitudinally thereof, a governor to control the position of said element comprising a pair of spaced sleeves mounted on the wind wheel shaft, said sleeves being held to rotate with the shaft and movable longitudinally thereof, and one of said sleeves being connected with said element and freely rotatable therein, governor arms comprising leaf springs provided with governor balls intermediate their ends connecting said sleeves, and manually controlled means to vary the position of the other sleeve longitudinally of the shaft.

In testimony whereof, I affix my signature, in presence of two witnesses.

SAMUEL BEY.

Witnesses:
CHARLES B. PRESCOTT,
JOHN COREY.